G. H. FOLLOWS.
MEANS FOR ATTACHING GEARS TO SHAFTS.
APPLICATION FILED JAN. 14, 1918.

1,403,309.

Patented Jan. 10, 1922.

WITNESSES:
Fred. E. Wilharm
F. A. Lind.

INVENTOR
George H. Follows
BY
Wesley G. Carr
ATTORNEY

UNITED STATES PATENT OFFICE.

GEORGE H. FOLLOWS, OF PITTSBURGH, PENNSYLVANIA, ASSIGNOR TO WESTINGHOUSE ELECTRIC & MANUFACTURING COMPANY, A CORPORATION OF PENNSYLVANIA.

MEANS FOR ATTACHING GEARS TO SHAFTS.

1,403,309.   Specification of Letters Patent.   Patented Jan. 10, 1922.

Application filed January 14, 1918. Serial No. 211,709.

*To all whom it may concern:*

Be it known that I, GEORGE H. FOLLOWS, a citizen of the United States, and a resident of Pittsburgh, in the county of Allegheny and State of Pennsylvania, have invented a new and useful Improvement in Means for Attaching Gears to Shafts, of which the following is a specification.

My invention relates to means for securing gears, hubs, sleeves, and similar shaft-encircling members to shafts, and it has for its object to provide means whereby such members may be secured together against relative rotative movement without the use of keys, splines or other similar securing devices that have heretofore been employed.

Figure 1:
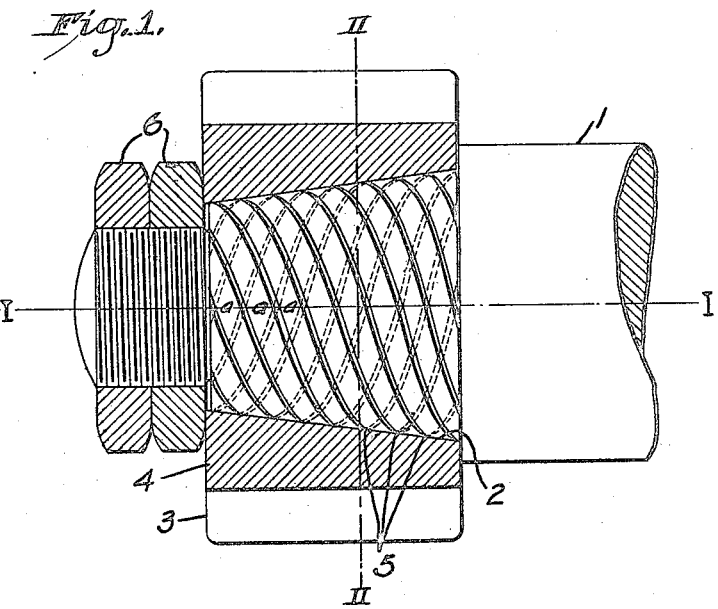
Figure 2:
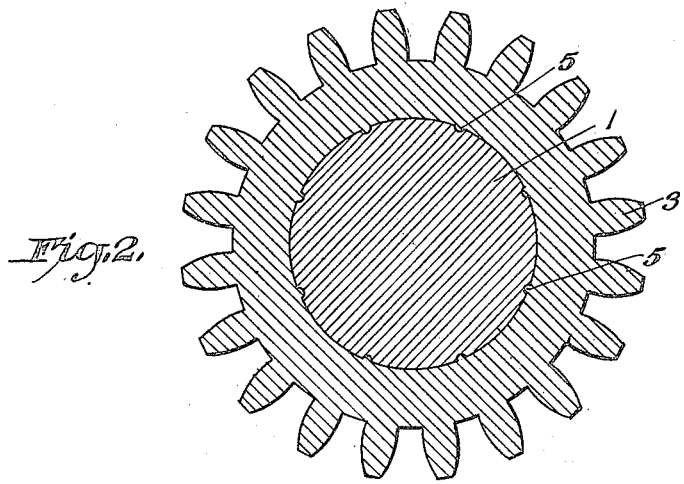

Fig. 1 of the accompanying drawing is a view partially in side elevation and partially in section of a portion of a shaft and a gear member secured thereon in accordance with my invention. Fig. 2 is a sectional view of the structure shown in Fig. 1 taken along the line II—II thereof.

Referring to the drawing, a shaft 1 is provided with a reduced portion 2, of substantially frusto-conical form upon which is mounted a gear member 3, comprising a substantially cylindrical hub or sleeve 4 the inner surface of which is machined to correspond to the portion 2 of shaft 1 but slightly smaller in diameter. The shaft 1 is preferably composed of metal that is considerably harder than the metal composing the hub 4, or the surface of the frusto-conical portion 2 may be suitably tempered or case-hardened.

Before the gear member 3 is applied to the shaft 1, the surface of the portion 2 is provided with a series of substantially parallel helical grooves 5, which are formed by etching, sand blasting, or other suitable method. The gear member 3 is then forced upon the shaft by means of a suitable press, and, as the bore of the hub is slightly smaller than that of the portion 2, the metal of the hub will have a tendency to be forced into the grooves 5. The gear member 3 is secured against longitudinal movement on the shaft 1 by means of nuts 6.

From the foregoing, it is apparent that the gear member 3 is effectively secured against rotative movement on the shaft 1 because the grooves 5 will resist such movement at a number of points along any given plane I—I passing through the longitudinal axis of the shaft as indicated at a—a in the drawing. Furthermore, any initial tendency for the gear member to turn on the portion 2 will be met by a constantly increasing resistance, as the edges of the grooves bite deeper into the hub 4. It will also be noted that, after the metal of the hub 4 has entered the grooves 5, it will be necessary for the metal to shear along the lines of all of the grooves passing through the plane I—I before the gear member can turn, so that the resistance to shearing between a gear member and a shaft secured together in accordance with my invention is many times that of a gear member and a shaft secured together by longitudinally extending grooves.

While I have shown my invention in a simple and preferred form, it is not so limited but is susceptible of various modifications within the scope of the appended claims.

I claim as my invention:

1. In combination, a shaft of relatively hard material having a tapering end portion provided with a plurality of substantially parallel helical grooves, and a gear member of relatively soft material having a tapering bore of slightly less diameter than the grooved portion of the shaft, whereby, when the gear member is forced into position on the tapering end of the shaft, metal will flow into the grooves.

2. In combination, a shaft member provided with a tapering end portion and a gear member having a tapering opening extending through its hub portion, the said opening being of slightly less diameter than the tapering portion of the shaft, one of said members being provided with a helical groove and the other being of relatively soft metal that will flow into the said groove when the gear member is forced into place on the shaft.

3. In combination, a shaft member provided with a tapering portion adjacent to its end and a threaded end portion of less diameter than the tapering portion, a gear member having a tapering opening extending through its hub portion, the said opening being of slightly less diameter than the tapering portion of the shaft, one of said members being provided with a helical groove and the other being of relatively soft metal that will flow into the said groove when the gear member is forced into place on the shaft, and a nut for engaging the said threaded end of the shaft to prevent longitudinal movement of the gear member with respect to the shaft.

In testimony whereof, I have hereunto subscribed my name this 2nd day of January, 1918.

GEORGE H. FOLLOWS.